(12) United States Patent
Moradell-Casellas

(10) Patent No.: US 9,010,204 B2
(45) Date of Patent: Apr. 21, 2015

(54) TORQUE LIMITER IN PARTICULAR FOR AN ACTUATOR OF THE NACELLE OF AN AIRCRAFT TURBOJET ENGINE

(75) Inventor: Pierre Moradell-Casellas, Saint Georges des Groseillers (FR)

(73) Assignee: Aircelle, Gonfreville l'Orcher (FR)

( * ) Notice: Subject to any disclaimer, the term of this patent is extended or adjusted under 35 U.S.C. 154(b) by 649 days.

(21) Appl. No.: 13/265,602

(22) PCT Filed: Apr. 7, 2010

(86) PCT No.: PCT/FR2010/050667
§ 371 (c)(1),
(2), (4) Date: Oct. 21, 2011

(87) PCT Pub. No.: WO2010/122253
PCT Pub. Date: Oct. 28, 2010

(65) Prior Publication Data
US 2012/0037723 A1 Feb. 16, 2012

(30) Foreign Application Priority Data
Apr. 23, 2009 (FR) ...................................... 09 01959

(51) Int. Cl.
*B63H 11/10* (2006.01)
*F02K 3/02* (2006.01)
*F02K 1/54* (2006.01)
*F16H 3/06* (2006.01)
*F02K 1/76* (2006.01)
*F16H 25/20* (2006.01)

(52) U.S. Cl.
CPC ............ *F02K 1/763* (2013.01); *F16H 25/2021* (2013.01)

(58) Field of Classification Search
USPC ................. 60/226.2; 244/110 B; 239/265.19, 239/265.25; 74/89.23, 89.37, 89.38, 89.39
See application file for complete search history.

(56) References Cited

U.S. PATENT DOCUMENTS

| 2,701,478 A | | 10/1949 | Riess | |
| 2,944,437 A | * | 7/1960 | Pickles | 74/89.37 |
| 3,202,008 A | * | 8/1965 | Geyer | 74/89.37 |
| 3,213,701 A | * | 10/1965 | Earl, Jr. | 74/89.37 |
| 3,704,765 A | | 12/1972 | Withrow et al. | |
| 4,712,440 A | * | 12/1987 | Rousselot | 74/89.39 |

(Continued)

FOREIGN PATENT DOCUMENTS

| EP | 1785346 A2 | 11/2006 |
| WO | 2004/113707 A1 | 6/2004 |

OTHER PUBLICATIONS

International Search Report issued Aug. 20, 2010 by European Patent Office re: PCT/FR2010/050667; citing: US 3,704,765 A; WO 2004/113707 A1, US 7,701,478 A, US 6,546,825 B1 and EP 1,785,346 A2.

*Primary Examiner* — Gerald L Sung
(74) *Attorney, Agent, or Firm* — Brinks Gilson & Lione

(57) ABSTRACT

The invention relates to a torque limiter for an actuator including a screw (101), a nut mounted on said screw, an actuation tube (105) rigidly connected to the nut and means (109, 133) for rotating said screw, said limiter being characterized in that it includes an abutment (115, 110) capable of: preventing the rotation of said tube (105) by friction simply by an axial force exerted by said screw (101) onto said nut during the movement thereof; and enabling the rotation of said tube (105) when said nut arrives at an axial abutment of said screw beyond a predetermined torque threshold defined by the axial force.

4 Claims, 2 Drawing Sheets

(56) References Cited

U.S. PATENT DOCUMENTS

| | | | |
|---|---|---|---|
| 5,088,339 A * | 2/1992 | Lochmoeller | 74/89.37 |
| 5,346,045 A * | 9/1994 | Bennett et al. | 192/141 |
| 6,167,694 B1 * | 1/2001 | Davies | 60/226.2 |
| 6,546,825 B1 | 4/2003 | Kugle | |
| 2001/0029797 A1 * | 10/2001 | Lange et al. | 74/89.37 |
| 2003/0084736 A1 * | 5/2003 | Darby | 74/89.23 |
| 2003/0140720 A1 * | 7/2003 | Krause | 74/424.71 |
| 2009/0288510 A1 * | 11/2009 | Latenstein Van Voorst et al. | 74/89.37 |

* cited by examiner

TORQUE LIMITER IN PARTICULAR FOR AN ACTUATOR OF THE NACELLE OF AN AIRCRAFT TURBOJET ENGINE

TECHNICAL FIELD

The present invention relates to a torque limiter, in particular for an actuator of the nacelle of an aircraft turbojet engine.

BACKGROUND

The nacelle of an aircraft turbojet engine has a number of moving parts, one typical example being the cascade thrust reverser cowl, which moves between a so-called "direct jet" position (which is adopted in particular during flight) and a "reversed jet" position (which is adopted during braking upon landing).

The displacement of these moving parts is commonly obtained using electric actuating means, as disclosed in application PCT/US2004/019260, and which has been shown in FIG. 1 appended hereto.

One such electric actuator comprises a worm 1 on which a nut 3 is screwed, which in turn is secured to an actuation tube 5, the free end of which ends with an eyelet 7.

The eyelet 7 is in turn fastened to a yoke 115 connected to the moving part to be displaced so that the rotation and translation between the yoke 115 and the eyelet 7 along the displacement axis of the screw 1 are eliminated.

Preferably, connecting rods 8 are inserted between the threads of the screw 1 and those of the nut 3, so as to reduce the friction, such that this type of actuator is commonly referred to as a "ball screw."

The screw 1 has, at its end opposite that of the eyelet 7, a pinion 9 with an oblique toothing cooperating with a master pinion 11, which in turn is directly or indirectly driven by an electric motor.

Under the action of that electric motor, it is possible to pivot the screw 1 in either direction, and thus to translate the nut 3 in either direction, and therefore to extend or retract the tube 5, said tube 5 being rotationally locked by the eyelet 7 and the yoke 115.

These movements of the tube 5 allow it, via its eyelet 7, to act on the part of the nacelle that one wishes to move, such as a cascade thrust reverser cowl (with the understanding that in general there are several actuators of this type to move such a cowl).

If, for certain reasons, the deployment speed of the tube 5 is poorly controlled at the end of the extension thereof, the actuated element, such as a reverser cowl, may come into abutment somewhat abruptly.

However, the entire mechanism for moving the tube 5 (electric motor, pinions, worm, nut, etc.) has significant inertia, and the abrupt abutment of the reverser cowl may result in damaging certain parts of the actuator and the cowl, and in particular parts located in the connecting area of the end of the tube 5 with the cowl.

For that reason, it is known to place a torque limiter 13, for example near the free end of the tube 5, i.e. just before the eyelet 7, as shown in the appended FIG. 1.

Placing such a torque limiter as far "downstream" as possible on the kinematic chain of the actuator relative to the torque generator formed by the electric motor makes it possible to best protect all of the parts of the actuator and the cowl in the event of an abrupt abutment of the actuated part (thrust reverser, for example).

Concretely, when such an abrupt abutment occurs, the kinematic energy stored by all of the mobile parts of the actuator can dissipate by friction or deformation of the members forming the torque limiter 13, depending on the nature of that limiter.

It should be noted that this limiter can be of the ball and spring, lug shearing, toothed, sliding, or other type.

In all cases, such a torque limiter is complex, bulky, heavy and difficult to calibrate precisely.

BRIEF SUMMARY

The present invention in particular aims to resolve these drawbacks.

This aim of the invention is achieved with a torque limiter for an actuator including a screw, a nut (110) mounted on said screw, an actuation tube rigidly connected to the nut (110) and means for rotating said screw, said limiter being characterized in that it includes an abutment capable of:

preventing the rotation of said tube (105) by friction simply by an axial force exerted by said screw (101) onto said nut (110) during the movement thereof; and enabling the rotation of said tube when said nut (110) arrives at an axial abutment of said screw beyond a predetermined torque threshold defined by the axial force.

The operation of this torque limiter is based on the fact that the rotation of the screw by the actuator results in exerting an axial force on said nut, tending to press the tube against the abutment, and the fact that that pressing results in creating frictional torque of the abutment on the tube, opposing the torque exerted by the nut on the tube.

As long as the torque exerted by the abutment is greater than that exerted by the nut, the tube remains rotationally fixed, and can continue to move under the rotation of the worm.

However, when the torque exerted by the nut becomes greater than that exerted by the stressed abutment, the tube can pivot in concert with the worm. This happens when the actuator reaches its end of travel under the effect of the kinetic energy accumulated by the inertia, then causing the sliding rotation of the abutment and therefore the tube, which is no longer translated.

It is therefore understood that by choosing the appropriate geometric, material and surface state characteristics for the abutment, it is possible to ensure a frictional torque of the abutment necessary for the translation of the tube while limiting the torque triggering threshold of the limiter upon axial abutments of the actuator.

In this way, one produces a torque limiter that is very simple, not very bulky, reliable and easy to calibrate.

According to other optional features of the torque limiter according to the invention:

said abutment comprises a substantially annular friction surface, which has inner (Ri) and outer (Ri) radii satisfying the following relationship:

$$\frac{2}{3} \cdot \frac{(Re^2 - Ri^2)}{Re^3 - Ri^3} \cdot Cf > \frac{P}{2 \cdot \pi \cdot \rho}$$

where:

Cf is the coefficient of friction of said friction surface,

P is the pitch of the actuator screw,

ρ is the output of the movement of the nut on its screw, this particular relationship defines the geometric characteristics of an annular abutment that may be suitable for implementation of the invention, with the understanding that the larger the left term of the inequation above is relative to the right term, the more the torque limiter will be triggered for a high outside axial resistance (i.e. caused by elements outside the actuator).

This torque limiter comprises means for keeping said abutment frictionally against the tube outside the operating phases of the actuator: these contact means, which in the context of the present invention must not be likened to permanent pre-stress means as can be found in the prior art actuators, make it possible to ensure that the friction function of the abutment may be exerted as of the beginning of rotation of the worm. In fact, before this screw rotates and under a null outside force, no axial force is exerted by the nut on the tube and therefore by the tube on the abutment, so that the beginning of the movement of the tube cannot occur: the aforementioned contact means, which in practice can assume the form of small springs keeping the abutment in friction, make it possible to do away with that risk of a starting flaw.

It is understood that any other means capable of retaining a small starting torque (such as a shearing pin, indexing ball, etc. for example) could resolve this same issue.

The present invention also relates to a yoke for fastening said tube on a moving aircraft nacelle part, remarkable in that it incorporates a torque limiter according to the preceding: this embodiment corresponds to the case where the torque limiter is not incorporated into the actuator strictly speaking, but to a fastening yoke mounted on the part to be actuated (such as a thrust reverser cowl).

The present invention also relates to an actuator of the type comprising a screw, a nut mounted on said screw, an actuation tube secured to said nut and means for rotating the screw, remarkable in that it comprises a torque limiter according to the preceding, placed between the nut and the free end of the tube: this embodiment corresponds to the case where the limiter is placed similarly to what is shown in FIG. 1, commented above.

According to one optional feature of this actuator, it comprises electric means for rotating the screw.

The present invention also relates to a thrust reverser for an aircraft nacelle, remarkable in that it comprises a cowl able to move between a direct jet position and a reversed jet position, and at least one actuator according to the preceding.

BRIEF DESCRIPTION OF THE DRAWINGS

Other features and advantages of the present invention will appear upon reading the following description and examining the appended figures, in which.

DETAILED DESCRIPTION

In all of these figures, identical or similar references (to within one hundred) designate identical or similar members or groups of members.

Figure 1:
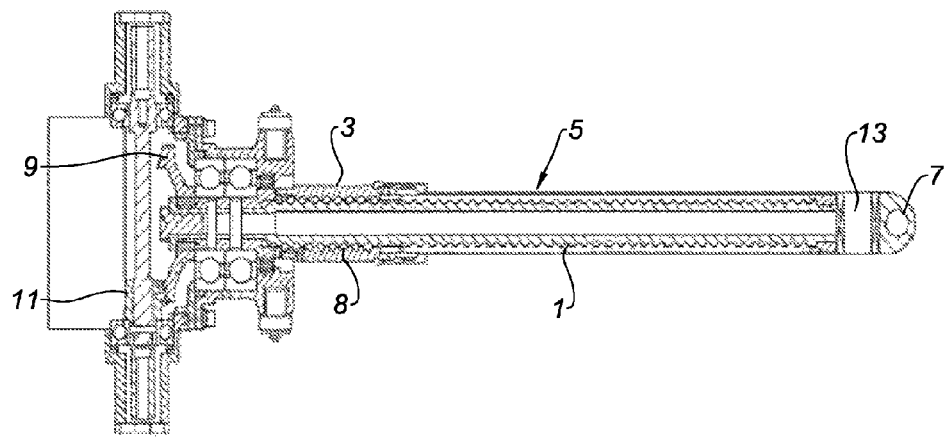
FIG. 1 is an axial cross-sectional view of an electric actuator of the prior art.

FIG. 1 shows an electric actuator of the prior art, for an aircraft nacelle thrust reverser.

This actuator has been described in detail in the preamble of this description.

Figure 2:
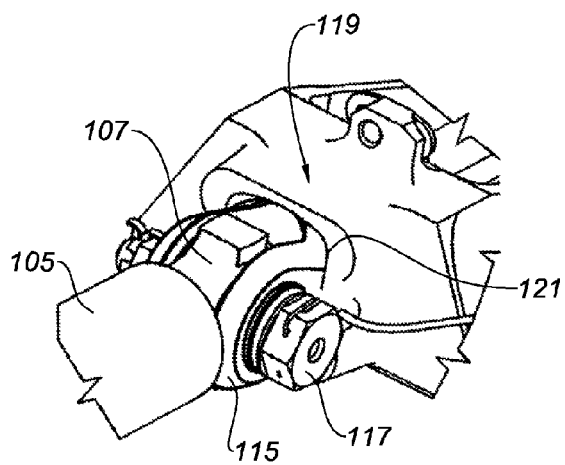
FIG. 2 is a perspective view of the cooperation zone of the end of an actuator according to the invention with the fitting of a thrust reversal cowl, in an embodiment where the torque limiter is inserted between a yoke for fastening the tube of the actuator and the moving part to be actuated.

We will now refer to FIG. 2, which shows the free end of the tube 105 of an electric ball screw actuator according to the invention.

The end of this tube 105 has an eyelet 107 that cooperates with a yoke 115 fastened on the eyelet by a bolt screw 117.

The yoke 115, which is substantially in the shape of a stirrup able to grip the eyelet 107, is in turn pivotably mounted relative to a fitting 119 secured to a moving part of an aircraft nacelle, such as a thrust reverser cowl.

The fitting 119, which is in fact a strengthened portion of the moving part, has a cavity 121 inside which the yoke 115 is mounted.

Figure 3:
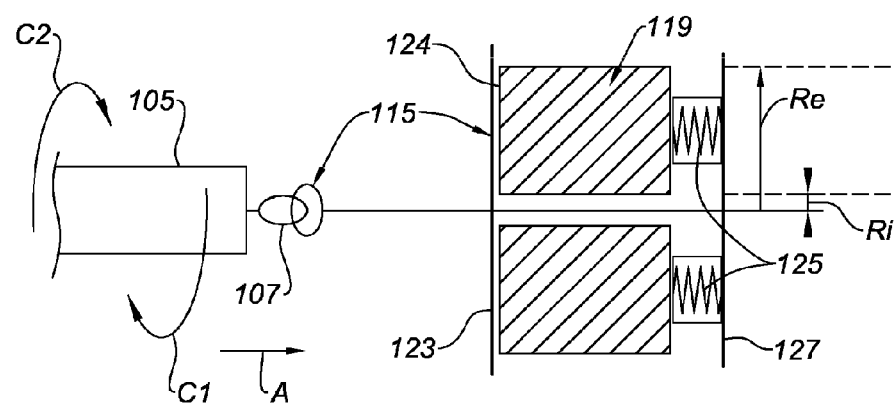
FIG. 3 is a diagrammatic view of how the parts shown in FIG. 2 cooperate.

More specifically, FIG. 3 makes it possible to understand the kinematic connections in play.

This FIG. 3 shows on the one hand that the yoke 115 is effectively pivotably mounted inside the fitting 119, but also that this yoke has a frictional part 123 able to frictionally rotate against a substantially annular surface 124 of the fitting 119.

The yoke 115 also comprises a bearing part 127 with a geometry substantially identical to the surface 123, thereby making it possible to ensure operation of the limiter substantially equivalent in both directions of the force. Between this bearing part and the fitting 119, contact-maintaining springs 125 are arranged.

These springs, of low force, have just the right size to ensure slight bearing of the frictional part 123 of the yoke 115 against the surface 124 of the fitting 119; it in no way involves pre-stress springs as they are understood in traditional torque limiters, i.e. springs exerting significant forces that can only be overcome in the torque limiting configuration.

Although not shown in FIGS. 2 and 3, the means for driving the tube 105 of the actuator according to the invention are similar to those for driving the tube 5 of the actuator of the prior art shown in FIG. 1.

The operation and advantages of the device just described are as follows.

When the ball screw rotates under the effect of the associated electric motor to extend the tube 105, the eyelet 107 of that tube 105 exerts an axial force A on the yoke 115, as shown in FIG. 3.

This axial force has the immediate result of pressing the frictional part 123 of the yoke 115 against the surface 124 of the fitting 119. Due to this contact of the frictional part 123 on that surface 124, the yoke 115 exerts, on the tube 105, a frictional torque C1 opposite the torque C2 exerted by the nut 110 of the ball screw on the tube.

If the frictional torque C1 is greater than the frictional torque C2, the tube 105 cannot pivot relative to the fitting 119, so that the nut of the actuator is rotationally immobile relative to the ball screw, thereby allowing the extension movement of the tube under the effect of the rotation of that screw.

When the travel of the ball screw is locked inside the actuator abruptly, in particular for example at the end of travel, the torque C2 created by the nut of the actuator can become greater than the frictional torque C1 created by the yoke 115 on the tube 105, thereby driving the rotation of said yoke relative to the fitting 119, and therefore the dissipation, by friction of the frictional part 123 on the surface 124 of the fitting 119, of the kinematic energy transmitted by the actuator.

This dissipation of energy makes it possible to avoid any damage of the actuator as well as the connecting parts of said actuator (yoke 115, fitting 119) at the thrust reverser means.

Very concretely, when the cooperation zone of the frictional part 123 of the yoke 115 with the surface 124 of the fitting 119 has a substantially annular shape with an inner radius Ri and an outer radius Re, as shown in FIG. 3, the condition according to which the frictional torque C1 is greater than the torque C2 created by the nut, thereby making it possible to move the tube 105 under the effect of the rotation of the ball screw, is written:

$$\frac{2}{3} \cdot \frac{(Re^2 - Ri^2)}{Re^3 - Ri^3} \cdot Cf > \frac{P}{2 \cdot \pi \cdot \rho}$$

In fact:

$$C1 = \frac{2}{3} \cdot \frac{(Re^2 - Ri^2)}{Re^3 - Ri^3} \cdot Cf \cdot F$$

and:

$$C2 = \frac{P}{2 \cdot \pi \cdot \rho} \cdot F$$

where:
F shows the axial force (i.e. in direction A shown in FIG. 3) transmitted by the screw to the nut,
Cf indicates the coefficient of friction of the friction surface 124 of the fitting 119,
P designates the pitch of the ball screw of the actuator, and
P designates the output of the ball screw.

Of course, the higher C1 is relative to C2, the higher the triggering torque threshold under outside axial force will be, the actuator being in inner axial abutment.

It is therefore understood that by acting in particular on the geometry of the contact zone between the fitting 119 and the frictional part 123, as well as the respective materials of the two members, the torque C2 can be placed just greater than the torque C1 to limit the triggering threshold.

The function of the contact-maintaining springs 125 is only to ensure that the frictional part 123 of the yoke 115 is in constant contact with the fitting 119, and in particular when the actuator is inactive, and therefore that the tube 105 does not exert any axial force on the yoke 115: in that particular case, in the absence of springs 125, it is possible for there then to be no contact between the part 123 and the fitting 119, in which case there could be no friction between those two parts, thereby allowing the tube 105 to pivot in concert with the ball screw, and therefore to translationally immobilize the tube 105.

It is therefore understood that these contact-maintaining springs 125, due to their low stiffness, have no pre-stress function similar to that found in the torque limiters of the prior art, and in particular in the torque limiters as taught by document PCT/US2004/019260 as described above.

It will be understood in light of the preceding description that the torque limiter according to the invention has an extremely rudimentary design, and is therefore very reliable.

A simple choice of suitable material and geometry for the parts in question makes it possible to determine the outside axial force threshold from which one wishes for the torque limiter to be activated to limit the deformation or destruction of the concerned pieces.

Of course, the torque limiter as described above could be placed at other locations of the actuator, and in particular at the actuator end, as was the case for the prior art device shown in FIG. 1.

It does, however, go without saying that the further the torque limiter is from the electric motor in the kinematic chain of the actuator, the more one reduces the risk of deformation of the parts, in case of an abrupt stop, in particular at the end of travel, of the part to be actuated (mobile cowl, thrust reverser for example).

Figure 4:
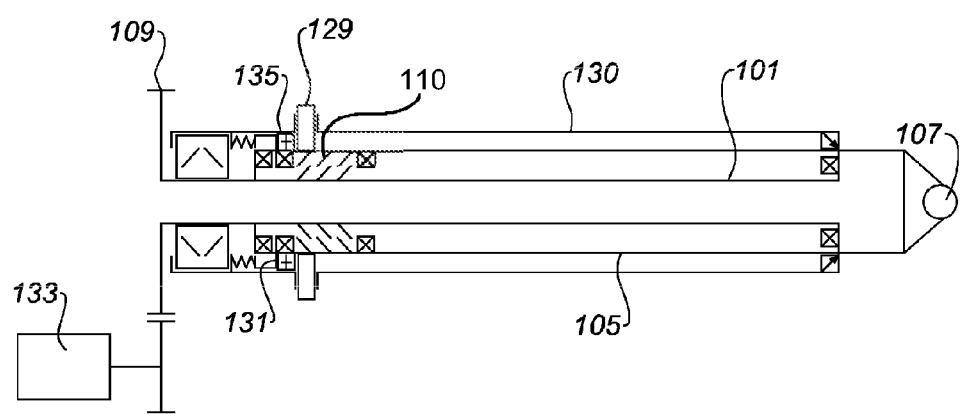
FIG. 4 is a diagrammatic view in axial cross-section of an electric actuator according to the invention, comprising a bolt for locking the translation of the tube.

FIG. 4 illustrates one possible application of the torque limiter just described to an electric actuator with ball screws equipped with a locking system 129 of the tube 105 in the retracted position.

As is known in itself, such a locking system 129, secured to a case 130 and often designated by PLS (Primary Locking System), can cooperate with a skirt 131 of the tube 105, so as to keep it in the retracted position illustrated in FIG. 4.

This locking system makes it possible to prevent any untimely opening of the actuated part (for example, thrust reverser cowl), in particular when the aircraft is in flight.

It is possible to provide for placing a torque limiter according to the teaching of FIGS. 2 and 3, i.e. for example in the yoke intended to cooperate with the eyelet 107.

The presence of such a torque limiter makes it possible to prevent, in the event the electric motor 133 of the actuator is started up in an untimely manner, the skirt 131 of the tube 105 from destroying the locking system 129: in fact, the torque limiter according to the invention makes it possible, if applicable, to rotate the tube 105 in concert with the worm 101, and thus to lock the translational movement of the tube 105, and therefore to eliminate the axial forces exerted by this tube via its skirt 131 on the locking system 129.

It will be noted that in this particular application, a ball bearing 135 should be placed between the skirt 131 and the locking system 129, so as to prevent parasitic friction that can alter the calibration of the torque limiter.

Of course, the present invention is in no way limited to the embodiment described and shown, which is provided as a simple example.

The invention claimed is:
1. A thrust reverser for an aircraft nacelle, comprising:
a cowl configured to move between a direct jet position and a reversed jet position; and a torque limiter,
the torque limiter for an actuator comprising:
a screw;
a nut mounted on said screw;
an actuation tube rigidly connected to the nut;
an electric motor for rotating said screw; and
an abutment,
wherein said abutment prevents rotation of said actuation tube by friction by an axial force exerted by said screw onto said nut during movement thereof, and said abutment enables rotation of said actuation tube when torque exerted by the nut becomes greater than torque exerted by said abutment.
2. The thrust reverser according to claim 1, wherein said abutment comprises a substantially annular friction surface, which has inner and outer radii satisfying the following relationship:

$$\frac{2}{3} \cdot \frac{(Re^2 - Ri^2)}{Re^3 - Ri^3} \cdot Cf > \frac{P}{2 \cdot \pi \cdot \rho}$$

where:
  Cf is the coefficient of friction of said friction surface,
  P is the pitch of the actuator screw,
  $\rho$ is the output of the movement of the nut on its screw.

3. The thrust reverser according to claim 1, further comprising springs for keeping said abutment frictionally against the actuation tube when the actuator is inactive.

4. The thrust reverser according to claim 1, further comprising a yoke for fastening said actuation tube on the cowl.

\* \* \* \* \*